Patented Apr. 25, 1950

2,504,952

UNITED STATES PATENT OFFICE 2,504,952

STABILIZED CHLORAL

Dwight Williams, Charleston, and Robert M. Thomas and George S. Haines, South Charleston, W. Va., assignors to Food Machinery and Chemical Corporation, New York, N. Y., a corporation of Delaware No Drawing. Application February 27, 1946, Serial No. 650,728

6 Claims. (Cl. 260—601)

This invention relates to stabilized chloral suitable for commercial use.

Chloral is becoming increasingly important as a commercial organic chemical where it is used in organic syntheses and as a pharmaceutical agent. Its prominence as a commercial chemical has been greatly increased by its being used as an intermediate in the production of D. D. T., namely, 2,2-bis-(4-chlorophenyl)-1,1,1-trichloroethane.

Chloral (trichloroacetaldehyde) is a substance which exists in polymeric as well as monomeric form. The monomer is a liquid having a freezing point of about —57° C. and a boiling point of about 97° C., while the polymers are solids. Upon standing at ordinary temperatures, the monomer changes to one or more polymeric solid forms. The problem of polymerization does not occur if the liquid chloral is used when freshly prepared, but, from a practical viewpoint, this is frequently impossible. Regardless of whether the chloral is used per se or as an intermediate, it is decidedly difficult and disadvantageous to use the liquid and solid form conjointly. Generally speaking, it is far better to have the chloral in the liquid form. The polymers may be reconverted to the liquid monomer by distillation in the presence of mineral acids or by other costly procedures which should be avoided. Thus it is of great practical importance to provide commercial chloral in a form which is stable in storage.

Previous attempts to stabilize chloral have been directed principally towards stabilizing it against its tendency to undergo autoxidation in the presence of air. Some success has been experienced in the stabilizing of chloral, but all of the stabilizers known in the prior art have imparted color to the chloral of such intensity that the chloral is no longer suitable for commercial purposes.

It is therefore a major purpose of this invention to provide chloral having its tendency to polymerize substantially completely inhibited or greatly retarded by the incorporation of a stabilizing agent without imparting any color to the chloral or by imparting color which is not of objectionable intensity. It is a special object of our invention to provide chloral which is sufficiently stable in storage and during transportation to permit its being supplied to manufacturers in a form suitable for use as an intermediate in the economical manufacture of D. D. T. substantially free of objectionable color.

We have found that certain nonaromatic ethers, including aliphatic and cyclic ethers, are capable of reducing the tendency of chloral to polymerize approximately 90 per cent without imparting any color whatsoever. We have found also that aliphatic amines and certain other nonaromatic compounds containing nitrogen have the property of substantially completely inhibiting the tendency of the monomeric chloral to polymerize while imparting either no color or color of an intensity which is not objectionable.

Among the ethers suitable for stabilizing the chloral are the various aliphatic and cyclic ethers, but diethyl ether, diisopropyl ether, and 1,4-dioxane have been found especially suitable, for they not only exert a stabilizing effect upon the chloral but may be readily dissolved in the chloral in an effective quantity without imparting any color whatsoever to the chloral composition. The aliphatic amines and certain other nonaromatic amine compounds exert an even stronger inhibiting action upon the tendency of the chloral to polymerize. Some of these nitrogen compounds impart discernible color to the chloral, but the preferred compounds can be incorporated in effective quantities without imparting color of an objectionable intensity. Among the nitrogen compounds found particularly suitable are the primary aliphatic amines of 1 to 18 carbon atoms, more particularly the monoalkyl amines of 10 to 18 carbon atoms, including n-decylamine, n-dodecylamine, n-tetradecylamine, n-hexadecylamine, and n-octadecylamine. Other suitable amine nitrogen compounds are morpholine, certain secondary and tertiary aliphatic amines, and the cycloaliphatic primary amine cyclohexylamine.

The foregoing amines and ethers may be used singly or as an admixture. In referring to nonaromatic amines or nonaromatic ethers, we mean those amines and ethers which do not contain an aromatic group attached directly to the amine nitrogen or ether oxygen atom.

It will be understood that the term ether as used herein is used in the conventional sense, namely, to encompass compounds containing a carbon-oxygen-carbon linkage with only carbon or hydrogen attached to the carbon involved in said linkage.

The inhibitors or stabilizers may be incorporated in varying amounts, depending upon their inhibiting action. Generally speaking, percentages within the range of 0.05 per cent and 0.25 per cent by volume are adequate, although percentages varying from 0.001 per cent to 1 per cent have been found to be practical from an economic standpoint. Certain of the ethers have been used in concentrations as high as 10 per cent without imparting any undesirable properties to the chloral, but the preferred concentration of ethers does not usually exceed about 0.25 per cent by volume.

In evaluating the capacity of the stabilizers to inhibit the tendency of chloral to polymerize, we found that variations in the specific gravity of the chloral were not always a reliable index of the degree of polymerization, for the specific gravity may be increased by the formation of chloral hydrate through the absorption of moisture from the atmosphere. We observed further that turbidity represents a useful qualitative index of the degree of polymerization, but such an index does not constitute a quantitative evaluation. Knowing that the polymer of chloral is practically insoluble in water while chloral itself is soluble in water, a special procedure was developed for a quantitative determination of the amount of polymer present in a monomer composition which had stood over a considerable period of time. The procedure consisted in adding 10 ml. of chloral to 100 ml. of water, boiling for 2 or 3 minutes, filtering, drying the precipitate, and weighing the latter. The dried precipitate represented the amount of chloral which had been converted into the solid polymer. In order to obtain a measurement of the potency of the various inhibitors, a rating was calculated by dividing the concentration of the polymer in a test specimen by the concentration of the polymer in the control specimen and multiplying this ratio by 100. This device gave a comparison on a percentage basis of the relative amount of polymer present respectively in the test and the control specimens. For instance, a rating of 1.0 indicates that only 1 per cent as much polymer was formed in the test specimen as in the control specimen.

In order to determine the amount of color present in the test specimen, both visual observation and photoelectric measures of the light absorbed by a layer of the chloral were used. The photoelectric evaluation was made with a 40 mm. layer of chloral, using a C5-47 Wratten filter (blue). The color index assigned was based upon the percentage of incident light which was absorbed by the liquid. It was not possible to determine the color of the control samples by photoelectric means due to the presence of turbidity resulting from polymerization. Visually, control samples had no color after standing for thirty days.

The tables which follow constitute an evaluation of a number of compounds which have been found suitable for stabilizing chloral against polymerization evaluated in accordance with the procedure outlined above. In several instances, indicated by omissions from the table, the photoelectric evaluation of the intensity of the color was not accurately obtainable. In certain instances the inability to accurately measure the color intensity photoelectrically was due to the fact that the inhibitor or stabilizer was not completely soluble in the chloral.

The comparisons were made by keeping the control and the experimental samples in a dark room for thirty days before the degree of polymerization of the chloral was evaluated.

*Table I.—Ethers*

| Ether | Conc., Vol. Percent | Stability Rating | Color, Visual | Color Photo-elec. |
|---|---|---|---|---|
| Diethyl Ether | 0.25 | 11 | None | 0.0 |
| Diisopropyl Ether | 0.25 | 15 | ...do | 0.0 |
| 1,4-Dioxane | 0.25 | 15 | ...do | 0.0 |
| Ethylene Glycol Monomethyl Ether | 0.25 | 23 | ...do | 0.0 |
| Control | | 100 | ...do | |

*Table II.—Nitrogen compounds*

| Compound | Conc., Vol. Percent | Stability Rating | Color, Visual | Color Photo-elec. |
|---|---|---|---|---|
| Ethylene diamine | 0.10 | 0.5 | Yellow | 30 |
| Di-n-propylamine | 0.10 | 4.0 | ...do | 58 |
| Di-n-butylamine | 0.10 | 4.0 | ...do | 42 |
| n-Amylamine | 0.10 | 0.5 | ...do | 49 |
| Triamylamine | 0.10 | 3.0 | ...do | 42 |
| Cyclohexylamine | 0.10 | 0.9 | Orange | |
| Mono-n-decylamine | 0.10 | 0.5 | Yellow | 20 |
| Mono-n-dodecylamine | 0.05 | 0.3 | None | 10 |
| Mono-n-dodecylamine | 0.10 | 0.3 | Yellow | 48 |
| Mono-n-dodecylamine | 0.25 | 0.3 | Orange | 68 |
| Mono-n-tetradecylamine | 0.10 | 0.3 | Yellow | 17 |
| Mono-n-hexadecylamine | 0.10 | 0.2 | None | |
| Mono-n-octadecylamine | 0.10 | 0.6 | Yellow | |
| Morpholine | 0.10 | 12.0 | None | 8 |
| Control | | 100 | ...do | |

Certain aromatic compounds have been suggested as stabilizers for chloral, especially against autoxidation, but in accordance with our evaluations they are unsatisfactory as stabilizers against polymerization. Apparently in the oxidation tests of the prior art, the chloral was purified by converting it to methachloral in the presence of sulfuric acid, washing the methachloral, and reconverting the methachloral to chloral by heating. The chloral used in all of our evaluations was purified by contacting it with sulfuric acid, decanting it therefrom, and distilling it from the decanted mass.

The following table shows the relative unsuitability of a representative group of aromatic compounds for stabilizing chloral against polymerization particularly when the intensity of the color imparted is taken into consideration. In the evaluations the inhibitor was added in a quantity equaling 0.1 per cent by volume when the inhibitor was a liquid and in a quantity equaling 0.1 per cent by weight when the inhibitor was a solid.

*Table III.—Aromatic compounds*

| Compound | Stability Rating | Color, Visual | Color Photo-elec. |
|---|---|---|---|
| Phenylene diamine | 6 | Brown | 100 |
| Phenyl-naphthylamine | 6 | Black | 100 |
| o-Aminophenol | 8 | ...do | 100 |
| Diphenylamine | 9 | ...do | 100 |
| Aniline | 14 | ...do | 100 |
| Pyridine | 14 | Yellow | 59 |
| α-Naphthol | 85 | Black | 100 |
| Phenol | 91 | Pink | 100 |
| Hydroquinone | 97 | Red | 100 |
| Catechol | 99 | Black | 100 |
| Resorcinol | 122 | Red | 100 |

It will be understood that the foregoing description of our invention is illustrative and that modifications, adaptations, and alterations in the procedures and compositions disclosed may be made without departing from the scope of our

We claim:

1. A chloral composition having its color characteristics substantially unchanged and its tendency to polymerize greatly retarded consisting of chloral containing therein not more than 1 per cent by volume of a nonaromatic ether.

2. A chloral composition having its color characteristics substantially unchanged and its tendency to polymerize greatly retarded comprising chloral containing therein not more than 1 per cent by volume of an aliphatic ether.

3. A chloral composition having the color characteristics of untreated chloral and its tendency to polymerize greatly retarded comprising chloral containing not more than 1 per cent by volume of diethyl ether dissolved therein.

4. A process for stabilizing chloral which comprises adding to commercially pure chloral not more than 1 per cent by volume of an aliphatic ether.

5. A chloral composition comprising chloral having incorporated therein not more than 1 per cent by volume of diisopropyl ether.

6. A chloral composition comprising chloral having incorporated therein not more than 1 per cent by volume of 1,4-dioxane.

DWIGHT WILLIAMS.
ROBERT M. THOMAS.
GEORGE S. HAINES.

REFERENCES CITED

The following references are of record in the file of this patent:

UNITED STATES PATENTS

| Number | Name | Date |
|---|---|---|
| 1,763,326 | Reed | June 10, 1930 |

FOREIGN PATENTS

| Number | Country | Date |
|---|---|---|
| 612,396 | France | July 31, 1926 |

OTHER REFERENCES

Trillat, "Bull. Soc. Chim. (Mem.)," Ser. 3, vol. 17, pages 231–234 (1897).

Meyer et al., "Liebig's Annalen," vol. 171, pages 76–78 (1874).